(12) United States Patent
Nayak et al.

(10) Patent No.: US 7,829,041 B2
(45) Date of Patent: Nov. 9, 2010

(54) JET-WHEEL IMPACT ATOMIZER FOR SPRAY DRYING

(75) Inventors: Bijan Bihari Nayak, Bhubaneswar (IN); Pratima Kumari Mishra, Bhubaneswar (IN); Hemanta Kumar Tripathy, Bhubaneswar (IN); Bhabani Sankar Acharya, Bhubaneswar (IN)

(73) Assignee: Council of Scientific and Industrial Research, New Delhi (IN)

( * ) Notice: Subject to any disclaimer, the term of this patent is extended or adjusted under 35 U.S.C. 154(b) by 932 days.

(21) Appl. No.: 11/709,326

(22) Filed: Feb. 21, 2007

(65) Prior Publication Data

US 2007/0205303 A1      Sep. 6, 2007

(30) Foreign Application Priority Data

Feb. 21, 2006   (IN) .......................... 475/DEL/2006
Feb. 21, 2006   (IN) .......................... 476/DEL/2006

(51) Int. Cl.
   *B01J 19/00*      (2006.01)
(52) U.S. Cl. .................................... 422/245.1; 422/229
(58) Field of Classification Search ............. 422/245.1, 422/229
   See application file for complete search history.

(56) References Cited

U.S. PATENT DOCUMENTS 4,422,900 A * 12/1983 Bordelon et al. ........... 159/48.1

* cited by examiner

*Primary Examiner*—Edward M Johnson
(74) *Attorney, Agent, or Firm*—Ladas & Parry

(57) ABSTRACT

The present invention provides an atomizer for producing finely dispersed spray of slurry/liquid and a process for the preparation of free flowing spray dried alumina powder. The jet-wheel impact atomizer based on the principle of addition of momenta has been invented and developed for spray drying. The atomizer works at significantly low slurry/liquid pressure (1-5 bar) and relatively lower speed (6000-14000 rpm). It saves a considerable amount of energy in view of above two advantages. Suspended solid in liquid is used as the feed slurry which is ejected from a nozzle in the form of a jet to hit against the toothed surface of a rotating wheel to cause atomization. The sprayed droplets are dried inside an associated drying chamber and collected through a screw conveyor at the bottom of the chamber. The feed solid at slurry stage is taken in the form of powder and includes ceramic, inorganic and organic compounds, food, drugs and Ayurvedic products. The liquid carrier includes water, aqueous, non aqueous inorganic and organic liquid, and precursor sol. Spheroidal/rounded grain spray dried powders are produced by the new type of atomization process.

4 Claims, 8 Drawing Sheets

Figure 6:
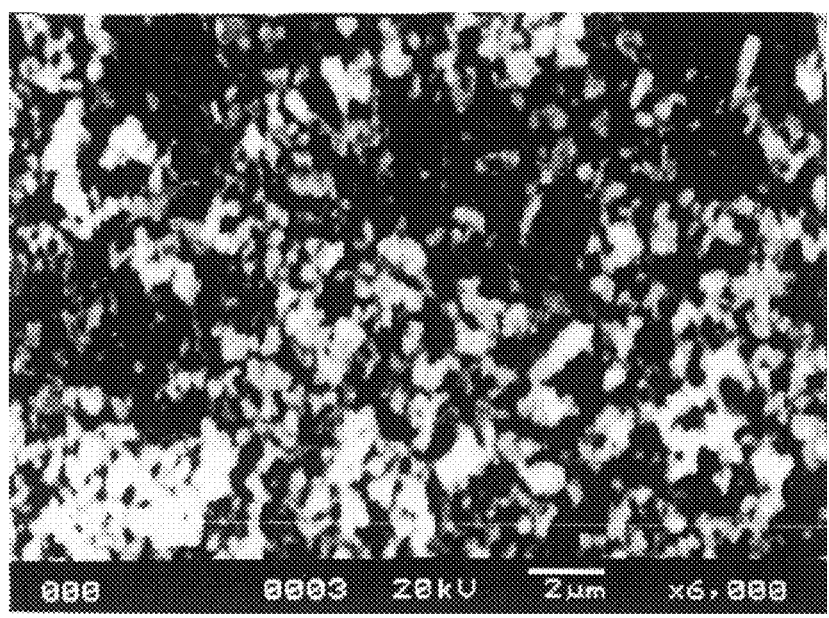

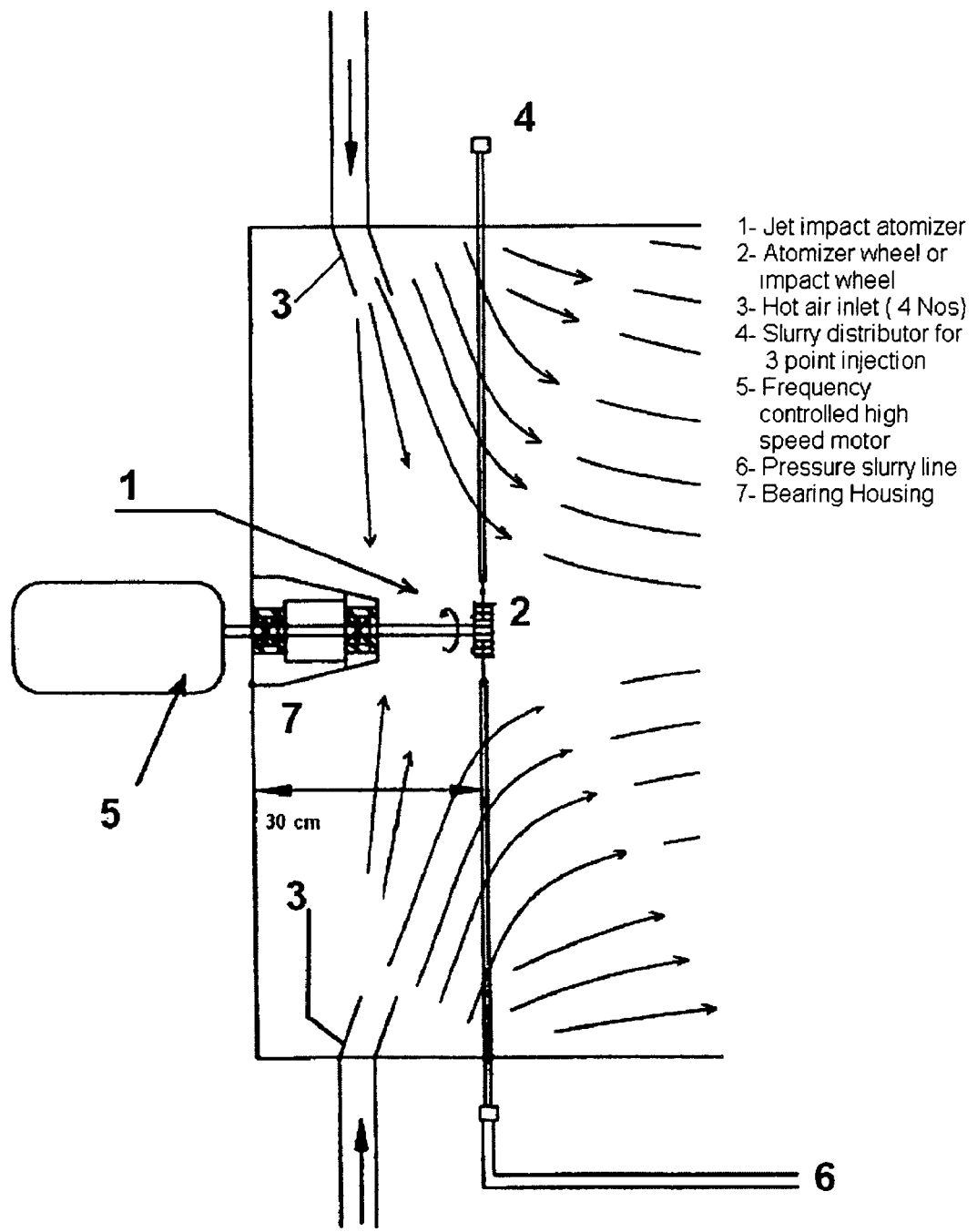
Fig. 1 : Jet -impact atomizer system

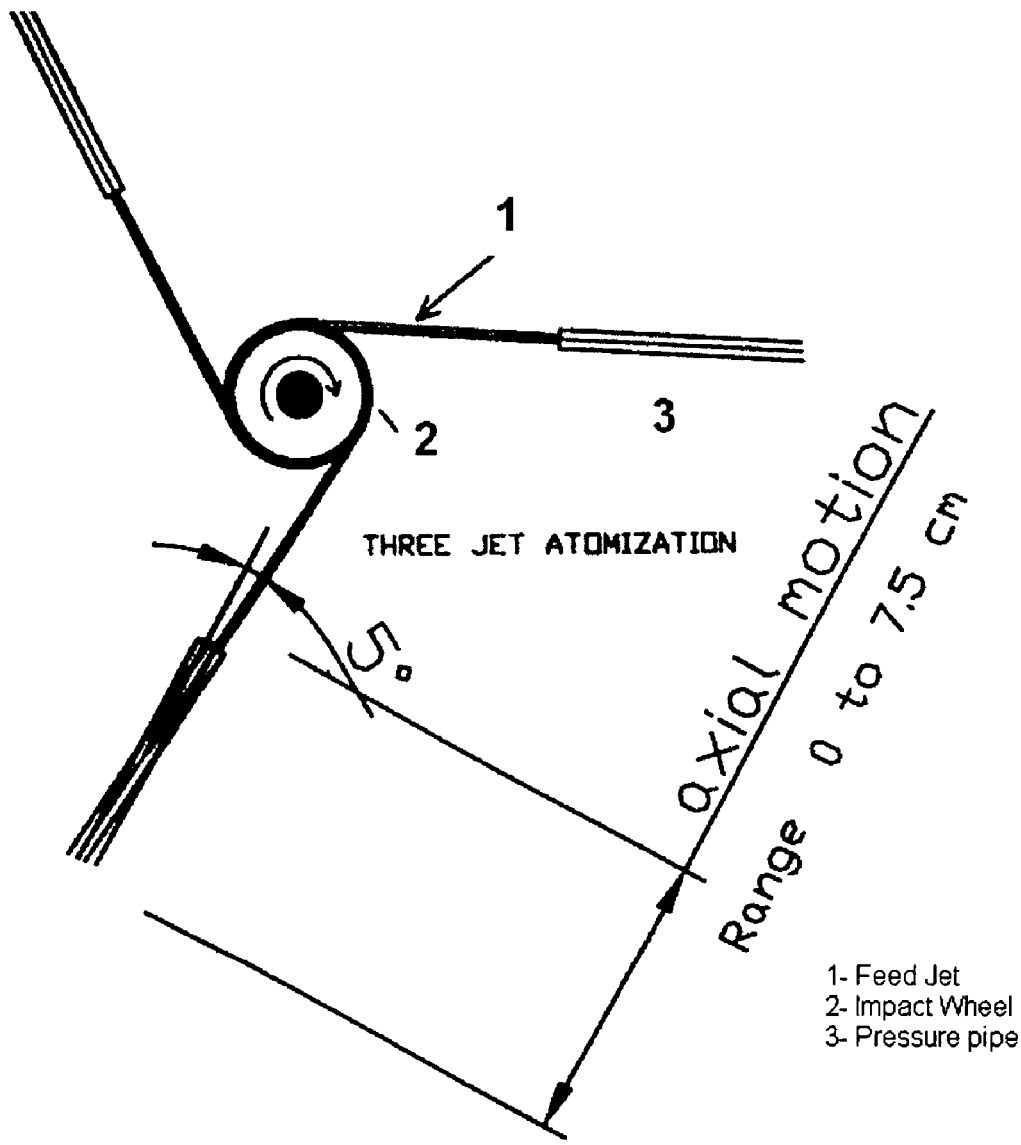
Fig.2 : Three jet atomization system

| Atomizer wheel | Outside diameter | Width |
|---|---|---|
| Size A | 7.5 cm | 2.5 cm |
| Size B | 10.0 cm | 2.5 cm |
| Size C | 12.5 cm | 2.5 cm |

1- Driving shaft
2- Impact wheel
3- Atomizer wheel

Fig.3 : Impact wheel for atomization

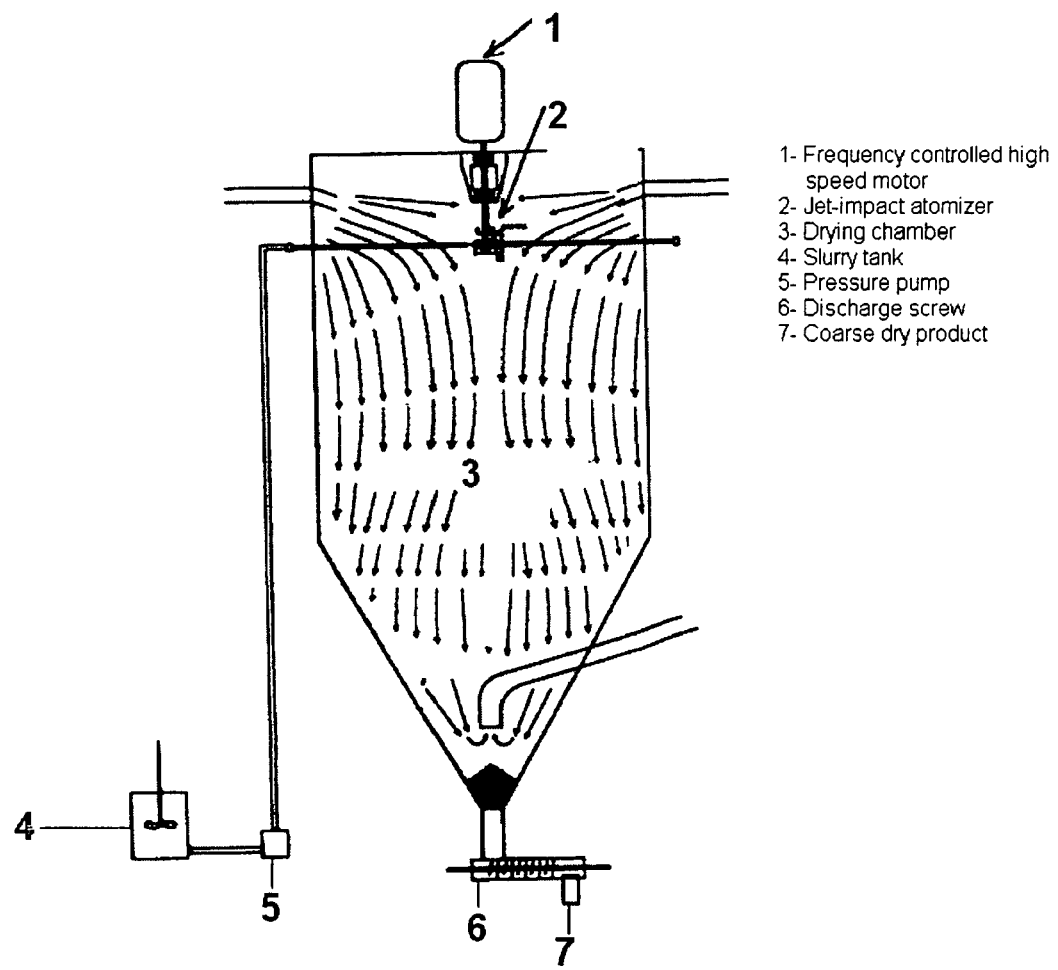
Fig. 4: Spray drying chamber with jet wheel atomization system

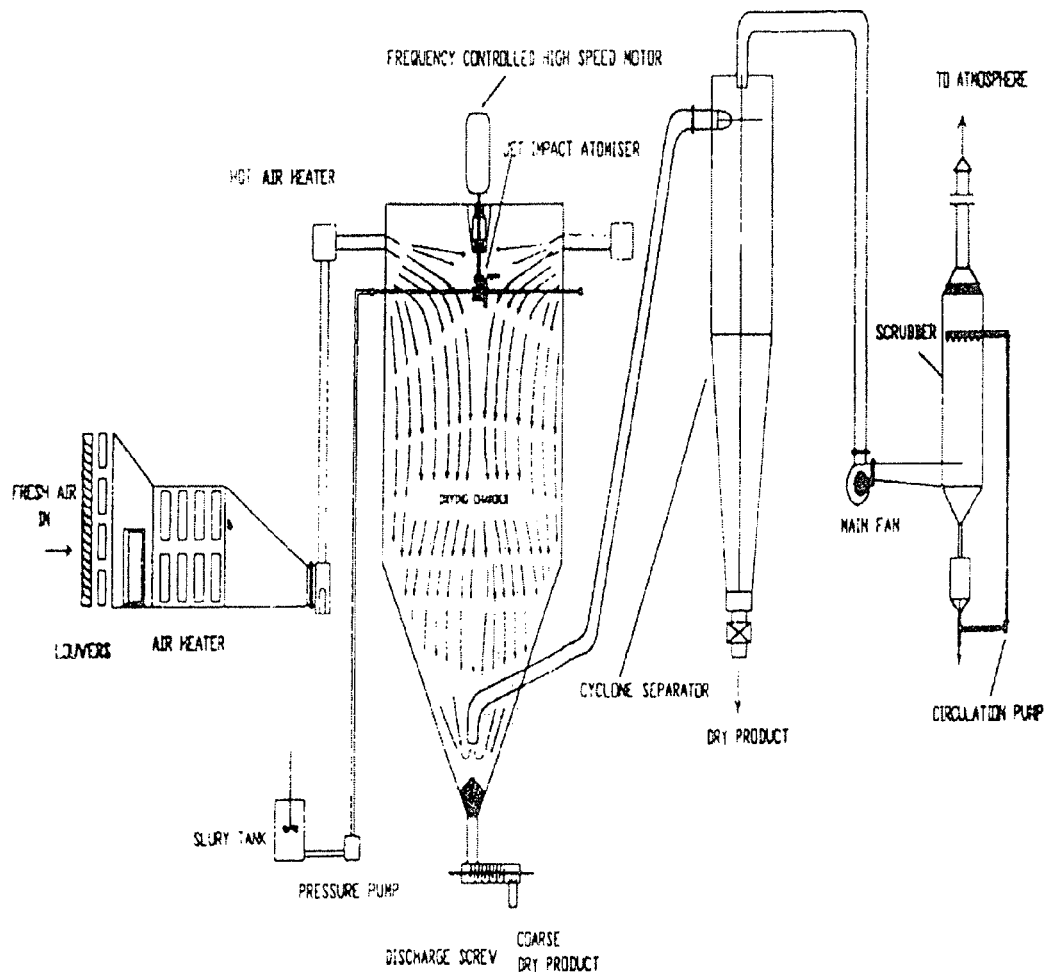
Fig. 5  General arrangement for producing spray dried alumina powder

JET-WHEEL IMPACT ATOMIZER FOR SPRAY DRYING

FIELD OF THE INVENTION

The present invention relates to novel Jet-wheel impact atomizer for spray drying of suspended solid-liquid slurry, precursor sol, chemical compounds or salts or their mixtures soluble in liquid solvents. The atomizer finds use in the preparation of various flowable ceramic powders, food products, drugs including Ayurvedic, detergent and washing powders, refractories and different chemical compounds. The present invention further relates to a process for producing free flowing spray dried alumina powder from alumina-water slurry by employing jet-wheel impact atomization.

BACKGROUND OF THE INVENTION

The atomization stage in spray drying produces a spray of droplets from liquid/slurry bulk having a high surface to mass ratio. The dried product that results from evaporation of the liquid part in the atomized spray can be made to possess the desired particle size distribution through control of the atomization variables. There are usually two types of atomizers, one rotary type and the other one is nozzle type. With rotary atomizers, centrifugal energy is utilized. This adopts a rapidly moving centrifugal disc/wheel with peripheral speed exceeding 200 m/s. Here the centrifugal force is used to break the slurry/liquid introduced through vaned wheel on disk which is ejected out in the form of thin sheet of liquid. Feed, on leaving the periphery, readily disintegrates into a spray of droplets. These types of atomizers require high rotating speed of the disc/wheel (up to 20,000 rpm in industrial scale) (Atomizers are found in the range from 3000 to 50,000 rpm). Also they require a larger diameter of drying chamber in view of projection of the sprayed particles taking place in horizontal direction. The maintenance cost of the high speed rotating parts is also high.

In case of nozzle atomization, high hydraulic pressure is used to spray slurry/liquid through an orifice. Here the pressure energy within the liquid bulk is converted into kinetic energy of thin moving liquid sheets. The sheets break up (i) under the influence of the physical liquid properties and (ii) by the frictional effects with the medium into which the liquid sheet is discharged. Invariably the medium is air. The drawback of this type of atomizers is that they need very high pressure in the range of 27-690 bar. Also in this case due to high pressure the nozzle wears very fast, especially when abrasive materials are used.

The conventional art of rotary and nozzle type atomizer used in spray dryers have been exhaustively dealt by the following:

1. Perrry's Chemical Engg. Hand book, Internat. Edn., Mc Graw Hill, p. 12.81-12.90, 1997.
2. K. Masters, Spray drying Hand book, The Pitman Press, Bath, UK, p. 3-6, 33-45, 1979.

Fred V. Shaw (Ceram. Bull, vol. 69, 1990, p. 1484-1489 describes the atomization process, basic spray drying process, mixing and drying in a spray dryer, powder separation, ancillary equipment and proper design requirement.

David Lee (Ceram. Bull., vol. 53, 1974, p. 232-234) has made a clear comparison between centrifugal and nozzle atomization in spray dryers with regard to resultant product characteristics, maintenance, design consideration and actual operations.

David Oakley (Chem. Engg. Progr., October 1997, p. 48-54) discussed the system design of spray dryers and concluded that rotary atomizers are chosen for small to medium size particle production where as pressure nozzle atomization are adopted for medium to large particle size powder preparation.

Zhao, Dowson and Jacobs, in 2000 (Modelling Simul. Mater. Sci. Eng. vol. 8, p. 55-65) have made modelling of liquid flow after a hydraulic jump on a rotating disk prior to centrifugal atomization.

U.S. Pat. No. 4,562,966 of Jan. 7, 1986 (Donald A. Smith & Richard C. La Flesh) describes the design of an atomizer based upon existing dual fluid atomizer technology (not fully inherent) for production of a dispersed spray of substantially liquid material (coal-water slurry) for augmenting the dispersion of liquid material as a spray. The nozzle diameter of the pressure nozzle type atomizer is chosen 10 times the diameter of largest particle present in the slurry and outlet pressure of slurry is maintained in the range 690-1380 kPa (6.9-13.8 bar). 70-110 μm diameter droplets are produced when air to fuel mass ratio is 0.1. The atomizer shows similar performance when 50% fuel mass flows at 0.3 and higher air to fuel ratio.

U.S. Pat. No. 4,383,649 of May 17, 1983 (Robert D. Reed, Richard R. Martin, Hershel E. Goodnight) describes an improved fuel oil pressure nozzle atomizer. Steam and oil flow under pressure coaxially to mix thoroughly at the central bore of the burner. Two factors have been identified to be important: (a) Central bore of burner must be of constant diameter from the point where the steam and oil mix, outwardly towards the burner tip ports (b) The total cross-sectional area of the tip ports must be less than the cross-sectional area of the central bore. The main object of this invention is to provide a improved oil fuel atomizer, which, on a pound for pound ratio of steam to oil provides a satisfactory flame, with minimum ratio of steam to oil.

U.S. Pat. No. 4,169,556 of Oct. 2, 1979 (Horst Muller) reports the design of a flat discharge device (pressure nozzle atomizer type) comprising separate inlet for liquid and solid particles and a tubular mouth piece of flat cross-sectional shape in which the solid particle and the liquid are to be mixed and ejected from the front face of the mouth piece. Wear of narrow side wall is of the mouth piece is claimed to be minimized by locating the solid particles completely within the liquid jet without touching the side walls. Liquid used is water and solid used are aluminium slag, quartz sand powder, chalk and rust particles.

An old Patent GB787934 of 1957 (American Cyanamid Co.) dealt with a centrifugal type of atomization in which an aqueous dispersion of hydrated silica containing catalyst material is sprayed outwardly from an axis of rotation while simultaneously impinging there on a set of convex surfaces moving in a circular path around said axis and discharging the material from the said surfaces in to a current of hot gases and drying resulting particles by contact therewith. Various prior art references, e.g. U.S. Pat. Nos. 3,032,275, 2,606,073, 4,252,276, 4,087,050, 3,920,187 describe atomizer for spray drying.

The above cited works have either used high pressure or high speed (rpm) to atomize slurry or solutions. In case of nozzle atomizers they require high pressure compressor and ducting system. Also, here nozzle wears very fast. On the other hand, the rotary atomizers require a larger diameter of drying chamber. No one has so far tried to simultaneously apply pressure nozzle with centrifugal wheel to atomize in a spray dryer. In order to overcome the cited shortcomings of the conventional rotary and nozzle type of atomizers, a novel atomizer has been designed.

The present invention of jet-wheel impact atomizer uses the simultaneous application of pressure nozzle and centrifugal wheel in one device for spray drying while employing low pressure as well as low wheel speed.

The free flowing alumina powder finds use in ceramics, electronics, thermal and electrical engineering.

Powders, in general, are characterized by irregular shaped grains. When subjected to stress, these grains mechanically interlock among themselves and prevent the free flow of powder. Free flowing powders of ceramics like alumina, zirconia, titania etc. are required for such applications as compaction, extrusion, plasma and high velocity oxygen (HVO) spray, thermal and electrical barrier coating, catalyst and catalyst support, high temperature components and parts etc. Alumina powder produced in large industrial plants (by Bayer's process) require granulation or spheroidization for filling mould or die uniformly with a view to achieve high densification (>90%) without voids and defects for manufacture of electronic component such as IC substrate and high density sintered products. Once the grains are made rounded or spheroidised, they become easily flowable or free flowing. At stage I of compaction, maximum densification is achieved by free flow property of powder.

Spheroidization or micro granulation of powder grains is widely done by spray drying of a slurry or sol in a drying chamber. Due to the effect of high velocity in spray and surface tension of the liquid, the slurry jet disintegrates into a large number of minute spherical droplets or atomized particulates which when undergo simultaneous drying at high temperature (300-500° C.), produce spheroidised or rounded particles or grains. Conventionally, there are two types of spray dryers: (i) Pressure nozzle type, (ii) Centrifugal or rotary type. Where as the pressure nozzle type spray dryer uses high slurry pressure (27-690 bar), the centrifugal type spray dryer employs high wheel speed up to 20,000 rpm in industrial practice. The jet-wheel impact atomizer based spray dryer, however, gets rid of the requirement of the above high slurry pressure and high wheel speed and operates within 5 bar slurry pressure and its wheel rpm ranges between 6000-14000, thus causing a considerable saving of energy in spray drying process and producing powder of different grain sizes. The present invention describes the preparation of free flowing alumina powder from suspended alumina-water slurry by adopting the jet-wheel impact atomization based spray drying process. Grain spheroidization or rounding has resulted in the free flow property and different particle sizes in alumina powder.

Masters' treatise on spray drying (Spray drying Hand book, Pitman, UK, 1979, page 33-45) discusses various aspects of spray drying with theoretical background. The Perry Chemical Engg. Hand book (McGraw Hill, 1997, page 12.81-12.90) illustrates and discusses the industrial designs of co-current and counter current spray dryers using high pressure nozzle and rotary type atomizers. James S. Reed has extensively dealt ceramic powder processing including spray drying, in his book 'Principle of Ceramics Processing', Second Edition, John Wiley, 1995, page 378-393.

K. Y. Shue et al. (Int. J. Powd. Met., vol. 31, 1995, page 145-153) have discussed centrifugal atomization of aluminium and the resulting morphology of the particles.

D. C. C. Lam et al. (J. Mater. Sci., vol. 30, 1995, page 5495-5501) have taken 28 and 32 vol % of alumina with different combination of binder and plasticizer and spray dried at 1.38 kPa pressure and 75° C. to produce alumina granules and studied their mechanical and microstructural properties in green bodies.

David E. Oakley (Chemical Engg. Progr. October, 1997, page 48-54) has dealt the conditions under which uniform particles can be prepared by rotary and pressure nozzle atomizers. One co-current rotary atomizer and three counter-current pressure nozzle atomizer have been discussed.

Kim and others (Chem. Mater. Vol. 14, 2002, page 2889-2899) have reported the synthesis of loosely agglomerated spherical nano porous alumina particles by spray drying a solution of aluminium nitrate and sodium chloride at 220-500° C. A. Kumar et al. have recently (J. Amer. Ceram. Soc. vol. 84, 2005, page 971-973) described the laboratory scale spray drying of precursor solution at 140 kPa pressure and a temperature of 500° C. to prepare spheroidised $La_{0.84}Sr_{0.16}MnO_3$ powder.

U.S. Pat. No. 5,302,368 of Apr. 12, 1994 (Harato et al.) describes a process where an aqueous slurry of about 100-1000 cP viscosity suspending about 200-2000 g/lit. of aluminium hydroxide particles smaller than 5 µm size is spray dried, and the dried powders are calcined to obtain alumina powders. The alumina powders have a sharp particle size distribution, being suitable for electronic, abrasive and refractory applications. US Patent Application No. 20020193236 of December, 2002 (M. Takaya et al.) describes a process for manufacturing spherical ceramic powder by spray drying. The process essentially consists of spraying a ceramic slurry through a nozzle at a temperature >100° C. and the liquid content of the sprayed droplets are removed to obtain granular powder. The mean particle size is found in the range 1-50 µm with a sphericity of about 0.8 or higher which is suited for mixing with resin material to form a compound. Various prior art references, e.g. U.S. Pat. No. 3,966,644 of 1976, U.S. Pat. No. 4,649,037 of 1987, U.S. Pat. No. 4,713,233 of 1987, U.S. Pat. No. 5,972,835 of 1999 describe the spray drying of alumina and other ceramic compounds to produce spherical powders.

The disadvantages of the above referred works are high erosion rates of the nozzles when abrasive slurry like alumina is used and also the relatively higher rpm of atomizer wheel (in case of centrifugal atomization) leading to higher energy consumption.

No work has so far been reported on the preparation of free flowing alumina powder produced by jet-wheel impact atomization based spray drying, a novel process that overcomes the above shortcomings.

The novelty of the invented process lies in the idea that through impact of a slurry/liquid drop against the spinning wheel moving opposite to the direction of slurry/liquid jet motion, transfer of momentum to slurry/liquid drop can take place up to 2 times (maxm.) that of the original momentum value. Kinetic energy for disintegration of drop will be available by 4 times (kinetic energy=$p^2/2$ m) more than the normal collision case (this takes place ideally for an elastic collision, some energy loss due to friction always takes place at nozzle and its orifice). Thus, at low slurry/liquid pressure, the slurry/liquid drop can be broken or atomized to thousands of tiny droplets without going to high pressure (29-690 bar in pressure atomization spray dryer) and high wheel speed (up to 20,000 rpm in centrifugal atomization spray dryer adopted in industrial production). The novelty of the process lies in the fact that unlike conventional spray drying (high pressure nozzle and rotary type atomizer based), it does not use high pressure slurry (29-690 bar) and high atomizer wheel speed (which goes up 40,000 rpm) but employs a unique combination of low slurry pressure (1-5 bar) and low atomizer speed (6000-14000). Thus, abrasive powder like alumina when used in this new kind of spray dryer (in slurry form), erosion of nozzle and wheel is significantly reduced due to low slurry pressure and low wheel speed. Another novelty of the invented process is that besides selecting a suitable slurry composition, the grain/particle size distribution in the alumina powder can be varied at choice by varying wheel diameter and wheel speed and a typical particle size distribution can be attained either by increased speed with reduced wheel diameter or vice versa.

The non-obviousness in the process is the small particle size of the alumina powder ($d_{90}$=1.5-4.7 μm) which can smoothly pass through the orifice of jet nozzle (0.6 mm diameter) in slurry form. Reduced viscosity of the slurry attained by addition of low cost chemical additive (dispersant) such as ammonium poly acrylate causes the small solid particles to homogeneously disperse throughout the volume of liquid such that clogging or chocking of jet orifice does not take place. The effect of dispersant and particle size of alumina powder (feed) contribute together to bring down the viscosity of the slurry to the range 2-100 cP, to the streamline flow range value of the carrier liquid, i.e. Water.

20-60 wt % alumina suspended slurry maintained at a low viscosity (2-100 cP) is injected at low pressure on to an atomizer wheel surface in the form of three jets. The rotating atomizer wheel disintegrates the slurry jets in to a large number of droplets at the wheel surface and the droplets are dried by hot air circulation (415-420° C.) inside a drying chamber. The outlet temperature of drying air is maintained at 95-110° C. Process parameters have been worked out to produce powder with particle size 37.5-105 μm (>59%) with sphericity more than 0.9. The powder is porous and found to be quite flowable (ffc: 17-18.5). The process shows >80% yield (by mass) and the product is found to exhibit good flowing performance in plasma torch for spray coating on substrate. The free flowing alumina powder finds good application ceramic industry in compaction, extrusion, manufacture of high tech and high density ceramic products, high temperature industrial components and parts, sintered products, refractories and castables. Also it finds wide use in making electronic component such as IC substrate, making cutting tools and wheels for mechanical engineering applications, and for coating thermal and insulating barriers on metal substrates.

OBJECTIVES OF THE INVENTION

The main objective of the present invention is provide an atomizer which works by hitting a slurry/liquid jet projected from outside against a rotating wheel and the slurry hits the toothed surface of wheel tangentially opposite to the direction of wheel motion.

Another objective of the invention is to provide an atomizer which utilizes the principle of momentum addition in the impact atomization process to make available up to 4 times higher kinetic energy (maximum) (takes place only in the ideal case of elastic collision) compared to conventional rotary atomizers and thus save energy in atomization.

Yet another objective of this invention is to run the atomizer at lesser rpm and at lesser working pressure (of slurry/liquid) than conventional atomizers.

Yet another objective of the present invention is to provide an atomizer which is less energy intensive due to its working capability at lesser rpm and lower working pressure of slurry/liquid.

Yet another objective of the present invention is to provide an atomizer which is safer to operate and needs lesser maintenance.

Yet another objective of the atomizer is to provide a spray of both aqueous and non-aqueous slurry/sol/liquid.

Yet another objective of the present invention is to provide a process for the preparation of alumina powder which are free flowing, by the jet-wheel impact atomization.

Yet another objective of the present invention to produce the free flowing powder from a suspended alumina-water slurry.

Another object of the invention is to produce the powder by using slurry of low viscosity.

Yet another objective of the process is to produce free flowing powder at low slurry pressure and relatively lower atomizer wheel speed.

Yet another objective of the invention is to produce the powder at relatively low drying temperature.

Yet another objective of the present invention is to make agglomeration of alumina grains from slurry by impact atomization technique and produce micro granules or spherical/spheroidal/rounded grains of alumina powder for achieving free flowing characteristics.

Still another objective of the invention is to produce powder of different particle sizes by varying the wheel speed, wheel diameter and slurry composition.

Yet another objective is to produce porous alumina powder.

Yet another objective of the powder is to produce alumina powder of good sphericity.

Yet another objective of this invention is to produce alumina powder of useful density.

Yet another objective of the invention is to produce free flowing alumina powder of low moisture content.

Still another objective is to produce the spheroidised alumina powder without changing the crystallographic phase of the feed powder.

SUMMARY OF THE INVENTION

Accordingly the present invention provides an atomizer for producing finely dispersed spray of slurry/liquid wherein the said atomizer comprising a plurality of nozzles and a rotary atomization unit comprising an impact rotating wheel (2) being rotated through a frequency controlled motor (5), the said nozzles being arranged around the impact wheel wherein the tangential velocity Of the rotatory wheel having teeth at direction opposite to the velocity of liquids/slurry jets coming out of nozzles facilitating the production of finally dispersed spray of slurry.

In an embodiment of the present the slurry used consisting of a quantity of solid material held in suspension within a liquid carrier.

In another embodiment the liquid carrier used is water or any aqueous or non aqueous solvent or sol including organic, inorganic and Ayurvedic.

In yet another embodiment the solid used is powder of ceramic selected from the group consisting of alumina, zirconia, titania, magnesia, silica and their suitable mixtures and solid solutions thereof and any organic or inorganic compound or their combinations, drugs including Ayurvedic, washing and detergent powders, and food products.

The present invention further provides a process for producing free flowing spray dried alumina powder, the said process comprising the steps of:

- a) preparing a homogenous alumina-water slurry consisting of 20-60% alumina powder along with additives, under stirring,
- b) pouring the above said homogenous alumina-water slurry in to a slurry tank and continuously stirring it,
- c) allowing the above said slurry to form jets by applying a pressure of 1-5 bar through a pump and then passing it through nozzles and hitting to the toothed surface of a rotating atomizer wheel spinning, at speed of 6000-16000 rpm to obtain the large number of tiny droplets, d) simultaneously drying the above said tiny droplets by intermixing it with hot air flow inside the drying chamber and moving the resultant dried droplets towards the conical bottom end of the drying chamber by the swirling air motion to obtain the spheroidised/rounded/spherical alumina powder, e) allowing the coarse particles to settle down and releasing the finer fractions of the droplets through a screw conveyor and sucking it in to cyclone separator by the reverse swing of air at the bottom end of drying chamber to separate out the finer particles at the cyclone end and passing the remaining effluent air slurry containing further fine particles through a wet scrubber to atmosphere for trapping the fine particles before releasing the air to atmosphere.

In yet another embodiment the additive used in alumina-water slurry is Consisting of 0.8-2.5 wt % of poly vinyl alcohol (PVA) as binder, 0.2-3 wt % ammonium poly acrylate (APA) as dispersant and 0.1-0.2 wt % ethylene glycol (EG) as plasticizer with respect to wt. of alumina.

In yet another embodiment plurality of nozzles (3) are used to produce slurry jets.

In yet another embodiment the plurality of hot air inlets (4) are used in dying chamber to evaporate the water component in sprayed droplets.

In yet another embodiment the toothed atomizer wheels of about 75-125 mm diameter are used to spray the slurry jet.

In yet another embodiment the low slurry pressure 1-5 bar and low atomizer wheel speed 6000-14000 are used to spheroidise alumina powder.

In yet another embodiment the alumina powder having $d_{90}$ 1.5-4.7 µm is used as suspended solid in the range of 20-60 wt % in water to prepare a slurry for spray drying.

In yet another embodiment the density and velocity of the slurry used is in the range of 1-1.5 $g/cm^3$ and 2-100 cP, respectively.

In yet another embodiment the slurry flow rate used is maintained at 5-27 lit/hour.

In yet another embodiment the flow rate of hot air used is in the range of 20-75 $m^3$/hour at <15 bar pressure for drying the slurry.

In yet another embodiment the sphericity of spheroidised, rounded, spherical alumina powder obtained is more than 0.9.

In yet another embodiment the porosity of the alumina powder obtained is in the range 24.5-41.48%.

In yet another embodiment the size of the alumina grains obtained is in the range of −25 to +300 µm with more than 59% in the range 37.5-105 µm.

In yet another embodiment the drying chamber pressure used is preferably maintained at 1.039-1.049 bar.

In yet another embodiment the moisture content in the spray dried powder obtained is in the range 0.4-1.5 wt %.

In yet another embodiment the density of the alumina powder obtained is as follows:

Bulk density in the range of 0.723-1.153 $g/cm^3$;

Tap density in the range of 0.833-1.310 $g/cm^3$;

Fill density in the range of 18.39-29.33% and sintered density up to 3.81 $g/cm^3$.

In yet another embodiment the free flowing alumina powder obtained exhibits a flowability (ffc) in the range of 17-18.

In yet another embodiment the flow of spheroidised alumina powder in plasma torch for spray coating showed deposition efficiency of 31-60%.

DETAIL DESCRIPTION OF THE INVENTION

In the present invention, an improved design over the conventional atomizer designs is provided wherein through impact of a slurry/liquid jet against the external surface of a spinning wheel moving opposite to the direction of slurry/liquid jet motion, transfer of momentum to slurry/liquid drop takes place up to 2 tines (maxm.) that of the original momentum value by addition of opposite momenta, thus increasing the available kinetic energy for disintegration of the drop up to 4 times (maxm. value, in case of elastic collision) without going to high nozzle pressure or high wheel rpm.

In another embodiment of the present invention, an atomizer wheel, which is also called the impact wheel, that has toothed surface, rotates at a speed of 6,000-16,000 rpm.

In yet another feature, the slurry jets coming out of a plurarity of nozzles (3 numbers) at a low pressure of 1-5 bar, hit tangentially on the impact wheel surface that spins in a direction opposite to the motion of the jets.

In yet another feature embodiment of the present invention, the diameter of the atomizer wheel/disk is kept variable (3 values) to attain different peripheral speed for atomization in order to obtain different particle size and handle slurries of different densities. Accordingly, axial distance between the wheel and the nozzles is kept adjustable. In still another feature embodiment of the present invention, the powder product generated by jet-wheel atomizer based spray drying is discharged through a screw conveyor from the bottom of drying chamber.

Thus, the features of the present invention are: (a) using lesser working pressure, i.e. 1 to 5 bar, than the standard nozzle atomizers, (b) using lesser rotating speed of the wheel/disk, i.e., 6,000-14,000 rpm, than the conventional industrial rotating atomizers, (c) using both nozzle and rotary atomization simultaneously that facilitates in getting rid of the disadvantages due to high slurry pressure and high speed of rotation of atomizer.

The present invention provides the design of a jet wheel impact atomizer for spray drying which comprises an atomizer for producing finely dispersed spray of slurry/liquid wherein jets of liquid/slurry coming out of nozzles impact on a rotating wheel having teeth at close/wide pitch on the impact surface and where tangential wheel velocity is in opposite direction to the velocities of liquid/slurry jets coming out of nozzles, employing both nozzle and rotary atomization simultaneously to overcome the disadvantages due to high slurry pressure and high speed of rotation of conventional atomizers and saving energy in atomization due to addition of momenta in impact atomization process and employing less centrifugal force due to lower rpm of atomizer wheel.

The design steps comprise of calculating/fixing dimensions like (1) nozzle working pressure, 1-5 $kg/cm^2$ (2) disk/wheel diameter, 75 mm, 100 mm, 125 mm (3) nozzle orifice diameter, 0.6 mm (4) number of teeth on disc, 5-15 (5) height of teeth, 5 mm (6) rpm of disc/wheel, 6,000-16,000, (7) provision to change the rotating disc of varying diameter to accommodate various types feed slurry (8) provision for varying peripheral speed between 6,000 to 16,000 rpm. (9) provision to adjust the nozzle and rotating disk distance with respect to different diameter of rotating wheel/disk.

On the basis of the dimensions thus obtained, an atomizer system has been fabricated. Other related accessories like drying chamber, heating system, cyclone, slurry tank, feed pump, blower, pipelines have been incorporated. Rounded grain powders could be produced in the range −25 to +300 µm rising various kinds of slurries.

A process for producing free flowing spray dried alumina powder has further been developed in this invention. While general alumina powders do not show good flowability due to mechanical interlocking among the irregular shaped grains, the present invention provides a novel method to make free flowing alumina powder by spheroidization of grains employing a new type of spray drying based on jet-wheel impact atomization. The novelty of the process lies in the fact that unlike conventional spray drying (high pressure nozzle and rotary type atomizer based), it does not use high pressure slurry (29-690 bar) and high atomizer wheel speed (which goes up 40,000 rpm) but employs a unique combination of low slurry pressure (1-5 bar) and low atomizer speed (6000-14000). Thus, abrasive powder like alumina when used in this new kind of spray dryer (in slurry form), erosion of nozzle and wheel is significantly reduced due to low slurry pressure and low wheel speed. Another novelty of the invented process is that besides selecting a suitable slurry composition, the grain/particle size distribution in the alumina powder can be varied at choice by varying wheel diameter and wheel speed and a typical particle size distribution can be attained either by increased speed with reduced wheel diameter or vice versa.

The non-obviousness in the process is the small particle size of the alumina powder ($d_{90}$=1.5-4.7 μm) which can smoothly pass through the orifice of jet nozzle (0.6 mm diameter) in slurry form. Reduced viscosity of the slurry attained by addition of low cost chemical additive (dispersant) such as ammonium poly acrylate causes the small solid particles to homogeneously disperse throughout the volume of liquid such that clogging or chocking of jet orifice does not take place. The effect of dispersant and particle size of alumina powder (feed) contribute together to bring down the viscosity of the slurry to the range 2-100 cP, to the streamline flow range value of the carrier liquid, i.e. water.

20-60 wt % alumina suspended slurry maintained at a low viscosity (2-100 cP) is injected at low pressure on to an atomizer wheel surface in the form of three jets. The rotating atomizer wheel disintegrates the slurry jets in to a large number of droplets at the wheel surface and the droplets are dried by hot air circulation (415-420° C.) inside a drying chamber. The outlet temperature of drying air is maintained at 95-110° C. Process parameters have been worked out to produce powder with particle size 37.5-105 μm (>59%) with sphericity more than 0.9. The powder is porous and found to be quite flowable (ffc: 17-18.5). The process shows >80% yield (by mass) and the product is found to exhibit good flowing performance in plasma torch for spray coating on substrate. The free flowing alumina powder finds good application in ceramic industry in compaction, extrusion, manufacture of high tech and high density ceramic products, high temperature industrial components and parts, sintered products, refractories and castables. Also it finds wide use in making electronic components such as IC substrate, making cutting tools and wheels for mechanical engineering applications, and for coating thermal and insulating barriers on metal substrates.

BRIEF DESCRIPTION OF THE DRAWING FIGURES

FIG. 1 JET IMPACT ATOMIZER SYSTEM: The figure shows a jet-wheel impact atomizer system where the impact wheel is made to rotate through a frequency controlled motor. The rotational speed of the motorized wheel can be varied from 6000 to 16000 rpm depending upon the requirement. Hot air enters the drying chamber through pipe line.

FIG. 2 THREE JET IMPACT ATOMIZATION SYSTEM: It shows how the three atomizer nozzles are arranged around the impact wheel. The axial distance between the wheel and the nozzle can be adjusted with respect to varying wheel diameter. The direction of tangential velocity of the wheel is just opposite to the direction of the flow of the slurry/liquid coming out of nozzle/slurry pipe line.

FIG. 3 IMPACT WHEEL FOR ATOMIZATION: The figure shows the atomizer wheel which is called as impact wheel. For accommodating various types of slurry/slurry, varying peripheral speed of the wheel is needed. This is also accomplished by varying the wheel/disk diameter. However the wheel width (thickness of disk: 2.5 cm) is kept constant.

FIG. 4 SPRAY DRYING CHAMBER WITH JET WHEEL ATOMIZATION SYSTEM: It shows a jet impact atomizer system where slurry is fed to the drying chamber through a pump from slurry/liquid tank. Electrically heated dry air is circulated inside the chamber to intermix with the sprayed droplets and remove the liquid content of droplets by way of evaporation. The dried product is discharged through a screw conveyor from the bottom of drying chamber.

FIG. 5: General arrangement for producing spray dried alumina powder.

FIG. 6: Morphology of alumina powder grains (feed stock used in slurry, $d_{90}$=1.5 μm) viewed under SEM.

FIG. 7: Typical morphology of alumina powder grains viewed under SEM, sample: spray dried from 40% alumina-water slurry FIG. 8: Typical morphology of alumina powder grains viewed under SEM, sample: spray dried from 30% alumina-water slurry.

The atomizer wheel, which is called as impact wheel, has toothed surface. The wheel is made to rotate through a frequency controlled motor. The rotational speed of the motor can be varied from 6000 to 16000 rpm depending upon the requirement. Three atomizer nozzles are arranged around this impact wheel. Slurry, discharged through nozzle orifices in the form of jets, hits tangentially to the exterior surface of wheel. The direction of tangential velocity of the wheel is just opposite to the direction of the flow of the slurry jet coming out of nozzle/slurry pipe line. For accommodating various types of slurry with varying peripheral speed of the wheel is needed. This is accomplished by varying the wheel or disk diameter. The axial distance between the wheel and the nozzle can be adjusted with respect to varying wheel/disk diameter. Hot air enters the drying chamber through pipe lines. The dried product is discharged through a screw conveyor from the bottom of drying chamber.

The novelties of the present invention are: (a) using lesser working pressure, i.e. 1 to 5 bar, than the standard nozzle atomizers, (b) using lesser rotating speed of the wheel/disk, i.e., 6,000-14,000 rpm, than the conventional industrial rotating atomizers, (c) using both nozzle and rotary atomization simultaneously that facilitates in getting rid of the disadvantages due to high slurry pressure and high speed of rotation of atomizer.

At the beginning, alumina-water slurry along with binder, dispersant and plasticizer is prepared by properly stirring and homogenising in a separate container for an hour. The slurry composition is designed as follows:

| | |
|---|---|
| Solid: | Calcined alumina powder |
| Liquid: | Water |
| Binder: | Poly Vinyl Alcohol (PVA) |

-continued

| | |
|---|---|
| Dispersant: | Ammonium Poly Acrylate (APA) |
| Plasticizer: | Ethylene Glycol (EG) |
| A typical composition: | |
| Wt. alumina powder= | x (g) |
| Wt. of PVA= | 1.3% x |
| Wt. of APA= | 2% x |
| Wt. of EG= | 0.155% x |

The slurry is then poured in to the slurry tank having provision for constant agitation to maintain homogeneous suspension of solid. The slurry is then passed through online filter and pressurised by a screw pump to send to the common distribution point located near the upper end of the drying chamber. From this point, the slurry is injected into the drying chamber by three nozzles located at 120° angle to each other. At the centre of roof of the drying chamber, the atomiser wheel (belt driven by the frequency controlled electric motor) suspends in to the drying chamber with the help of a shaft with high speed bearing arrangement. The slurry jet is projected in such a way that it hits the atomiser wheel tangentially in opposite direction to the motion of wheel. The toothed surface of wheel with proper pitch disintegrates the slurry jet in to large number of droplets. The continuous spray of these tiny droplets takes place inside the drying chamber shown in figure. The droplets intermix with high temperature dry air (inlet temp. 415-420° C.) introduced at four different points in the chamber and flow together in a spiral path due to tangential inlet of air to the drying chamber. The flow rate of air is maintained at <75 m³/hour. By the time the droplets reach the outlet of the dryer (outlet temp. of air 95-110° C.) towards the tip of inverted cone, the water component evaporates and the colloidal particles agglomerate to spheroidal or rounded shapes whose strength depend on binder and other additives added in the slurry. Air pre-heating is done by electrical heating to avoid contamination of product. Coarser product of the air slurry settles at the bottom of the drying cone which is discharged through a screw conveyor. Finer fraction of this slurry is separated and collected by cyclone separator by utilizing the counter current flow pattern of hot air at he tip of inverted cone of the drying chamber. Wet scrubber is used to further isolate and arrest most of the remaining particles left in the effluent before it is finally left to atmosphere.

The novelty of the process is that it has three variables to control for making suitable variation in grain size of the spheroidised alumna powder: (i) Diameter of atomizer disk which changes velocity of sprayed particle. Three different diameters are employed: 75 mm, 100 mm and 125 mm, (ii) Variable frequency (20-50 Hz) of electric motor which changes rpm of atomizer wheel (6000-16000) or the centrifugal force applied (iii) Slurry composition which changes the solid % (20-60 wt %) in water.

The following examples are given by way of illustration of the present invention and therefore should not be construed to limit the scope of present invention.

Example 1

40 wt % alumina-water slurry is prepared for spray drying as per the following composition:

| | |
|---|---|
| Alumina powder: | 4291.78 g |
| Particle size: | $d_{50}$ = 0.3-0.6 µm |

-continued

| | |
|---|---|
| | $d_{90}$ = 1.5 µm |
| Poly vinyl alcohol (PVA): | 55.79 g |
| Ammonium Poly Acrylate (APA): | 85.83 g |
| Ethylene glycol (EG): | 6.693 g |
| Water: | 6289.42 g |
| Viscosity of the slurry: | 16.8 cP |

Figure 7:
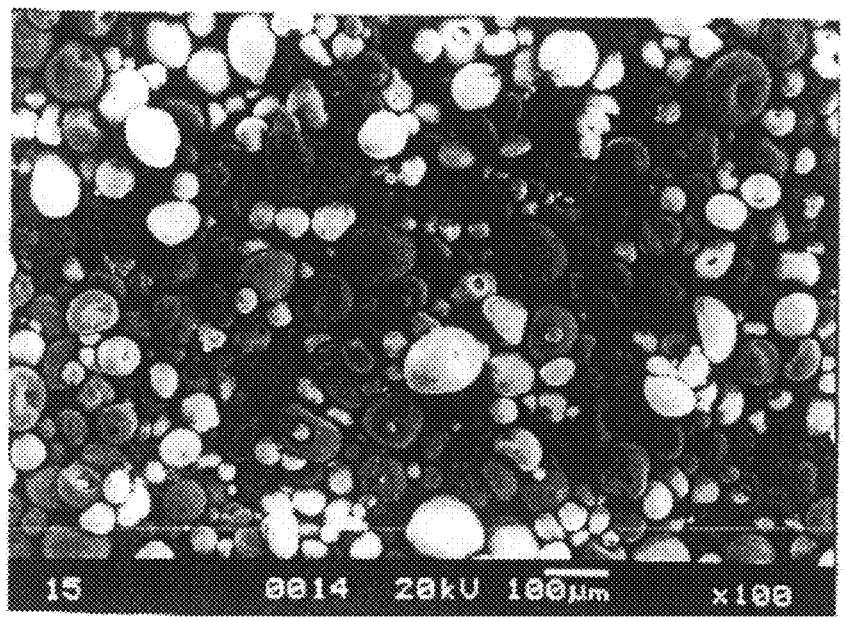

The slurry is prepared in a container by homogenising the mixture with an electrically driven stirrer. It is stirred for 1 hour and then poured in to the slurry tank and is allowed to be constantly agitated there by a stirrer. Electrical power is switched on at the control console and the inlet and outlet air flows of the drying chamber are made on. The heater is then switched on to heat the inlet air by electrical means. The temperature of the inlet air and outlet air are monitored through thermocouples. The drying chamber pressure was monitored by a water manometer. After about 30 minutes, when the temperature of the outlet air shows around 70° C., the atomizer wheel is switched on to rotate at a lower speed by suitable frequency control through the motor. After abut 45 minutes, the outlet temperature of air attains 95-100° C. and in the meanwhile within this next 15 minutes of time, the atomizer wheel speed is slowly increased to set at the desired value. Once the outlet air temperature of the drying chamber reaches 105° C., the inlet air temperature remains at around 420° C. The system now gets ready for spraying. The screw pump is switched on to pressurise the slurry and the water circulation pump for the wet scrubber is also switched on to sprinkle water in the scrubber chamber. For the 40% slurry, 2 bar of slurry pressure is maintained with 125 mm diameter wheel rotating at a speed of 1,225 rpm. After pressurising, the slurry is allowed to form the jets by passing through 3 nozzles (0.6 mm orifice) and hits against the toothed surface of the atomizer wheel in the spinning condition. The jets hit the wheel surface tangentially opposite to the direction of motion of the wheel. The jets are located at 120° angle to each other. The atomizer wheel breaks the slurry in to a large number of minute globular drops or droplets. By simultaneous intermixing with the hot air (flow rate 50 m³/hour) the droplets are dried and carried away by the swirling motion of air towards the conical bottom end of the drying chamber in a small time. By the time they reach there, relatively coarse particles settle and the finer fractions are carried away in to the cyclone by the reverse swing of air at the bottom end of drying chamber. Finer particles are separated at the cyclone end and further finer fraction goes to scrubber along with effluent. Water is constantly sprayed in the scrubber to settle them there and air is left out in to atmosphere. The above volume of slurry is spray dried within 30 minutes time while the drying chamber pressure is ~1.049 bar. Mass yield is found 81.6%. Particle/grain size is found in the range 37.5-105 µm (75.64%). Morphology of the grains is found spheroidal with sphericity of 0.92. Typical comparative morphology observed under SEM is shown in FIGS. 6 and 7.

Density of the powder is found as follows:

| | |
|---|---|
| Bulk density: | 1.07 g/cm³, |
| Tap density: | 1.19 g/cm³, |
| Fill density: | 27.25%, |
| Compact density (fired at 1540° C., 6 hour): | 3.73 g/cm³. |
| Moisture level is found 0.91 wt % and porosity in grains is 27.52%. | |

Free flowing property has been tested and value of linearised flow function (ffc) or flowability is determined by shear testing and is found 18.25 (as per Jenike classification). The crystallographic phase of the powder has been determined by XRD and is to found occur as α-alumina (corundum). The phase of the feed solid in slurry and the spray dried solid is observed to be the same.

Example 2

As per the following composition, 30% slurry is prepared for spray drying:

| | |
|---|---|
| Alumina powder: | 2543 g, |
| Particle size: | $d_{50}$ = 0.3-0.6 μm |
| | $d_{90}$ =1.5 μm |
| Poly vinyl alcohol (PVA): | 33.950 g |
| Ammonium Poly Acrylate (APA): | 50.851 g |
| Ethylene glycol (EG): | 3.966 g |
| Water: | 5753 g |
| Viscosity of slurry: | 13.15 cP |

Figure 8:
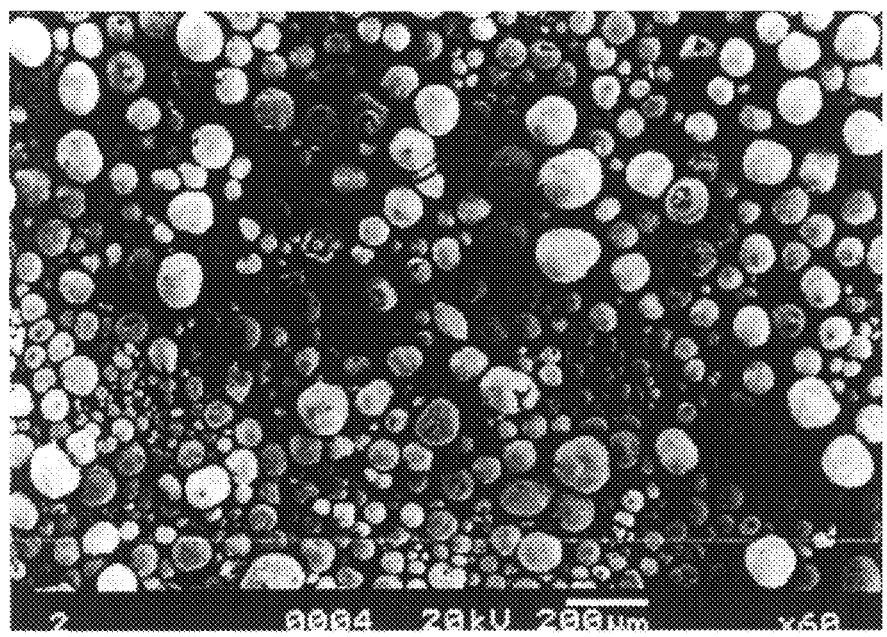

The experimental procedure employed in Example 1 are followed to produce the powder. Process conditions maintained in this case are:

Slurry pressure: 1-2 bar
Drying air temperature: Inlet temperature 100° C., Outlet temperature 415° C.
RPM of atomizer wheel: 13,745
Drying chamber pressure: 1.04 bar
Time required to spray the slurry: 12-15 min.
Hot air flow rate: 50 m³/hour.
Diameter of wheel used: 100 mm
Nozzle orifice diameter: 0.6 mm
The powder thus produced has been evaluated and show the following characteristic properties:
Mass yield: 80.7%.
Particle/grain size: 37.5-105 μm (75.7%).
Morphology of the grains: spheroidal with sphericity 0.93.
(Typical morphology observed under SEM is shown in FIG. 8)
Density of the powder:
Bulk density: 0.742 g/cm³, Tap density: 0.833 g/cm³, Fill density: 18.88%, Compact density (fired at 1540° C., 6 hour): 3.65 g/cm³.
Moisture level: 0.98 wt %
Porosity in grains: 39%.
Free flowing property has been tested and value of linearised flow function (ffc) is determined by shear testing and found 17.52 (as per Jenike classification). The crystallographic phase of the powder determined by XRD is found to occur as α-alumina (corundum). The phase of the feed solid in slurry and the spray dried solid is observed to be the same.
Plasma spray efficiency of powder in torch: 45%

Example 3

30% slurry of the composition in Example 2 is sprayed under similar process conditions of the said example except change in wheel rpm and diameter. The rpm of the atomizer is maintained at 13,745 and the wheel diameter is 75 mm.
The powder thus produced has been evaluated and shows the following characteristic properties:
Mass yield: 80.1%.
Particle/grain size: 37.5-105 μm (73.34%).
Morphology of the grains: spheroidal with sphericity 0.94.
Density of the powder:
Bulk density: 0.804 g/cm³, Tap density: 0.893 g/cm³, Fill density: 20.45%, Moisture level: 1.26 wt %
Porosity in grains: 37%.
The crystallographic phase of the powder determined by XRD is found to occur as α-alumina (corundum). The phase of the feed solid in slurry and the spray dried solid are observed to be the same.
Plasma spray efficiency of powder in torch: 52%

Example 4

30% slurry of the composition in example 3 is sprayed under similar process conditions of the said example except change in wheel diameter. The wheel diameter is maintained 125 mm (at 13,745 rpm speed).
The powder thus produced has been evaluated and shows the following characteristic properties:
Mass yield: 80.9%.
Particle/grain size: 37.5-105 μm (59.49%).
Morphology of the grains: spheroidal with sphericity 0.93.
Density of the powder:
Bulk density: 0.778 g/cm³, Tap density: 0.864 g/cm³, Fill density: 19.79%, Moisture level: 0.98 wt %
Porosity in grains: 39%.
The crystallographic phase of the powder determined by XRD is found to occur as α-alumina (corundum). The phase of the feed solid in slurry and the spray dried solid are observed to be the same.
Plasma spray efficiency of powder in torch: 60%
Thus, it is observed that by varying the wheel diameter in example 2, 3 and 4 at constant wheel speed (rpm), the particle size distribution and plasma spray efficiency change significantly.

The main advantages of the novel jet-wheel impact atomizer are:

1. The design wherein atomization is done at much lower slurry pressure than that in conventional nozzle atomizers.
2. An atomizer using both nozzle and rotary atomization simultaneously that facilitates in getting rid of the disadvantages due to high slurry pressure and high speed of rotation of conventional atomizers.
3. An atomizer which saves energy in atomization due to addition of momenta in impact atomization process and employs less centrifugal force due to lower rpm of atomizer wheel.
4. The design wherein atomization is done at relatively lower rotational speed of the rotating dis/wheel than normal rotary atomizers.
5. The design wherein a safer working pressure and rotation is involved.
6. The design wherein the robust and high pressure pipelines are avoided.
7. The design wherein less maintenance cost is involved by avoiding very high speed rotating parts.
8. The design wherein less maintenance cost is involved by avoiding high pressure working system.
9. The design wherein spray dried product is produced at lesser price.
10. The design wherein drying chamber of lesser dimension is required to produce the similar product through spray drying using rotary atomizers.

The invention claimed is:

1. An atomizer for producing finely dispersed spray of slurry/liquid wherein the said atomizer comprising a plurality of nozzles and a rotary atomization unit comprising an impact rotating wheel (2) being rotated through a frequency controlled motor (5), the said nozzles being arranged around the impact wheel wherein the tangential velocity of the rotatory wheel having teeth at direction opposite to the velocity of liquids/slurry jets coming out of nozzles facilitating the production of finally dispersed spray of slurry.

2. An atomizer according to claim 1, wherein the slurry used consisting of a quantity of solid material held in suspension within a liquid carrier.

3. An atomizer according to claim 2, wherein the liquid carrier used is water or any aqueous or non aqueous solvent or sol including organic, inorganic and Ayurvedic.

4. An atomizer according to claim 1, wherein the solid used is powder of ceramic selected from the group consisting of alumina, zirconia, titania, magnesia, silica and their suitable mixtures and solid solutions thereof and any organic or inorganic compound or their combinations, drugs including Ayurvedic, washing and detergent powders, and food products.

* * * * *